US012607729B2

(12) United States Patent
Engelbert

(10) Patent No.: US 12,607,729 B2
(45) Date of Patent: Apr. 21, 2026

(54) TEST SYSTEM FOR TESTING A LIDAR DEVICE

(71) Applicant: Horiba Europe GmbH, Darmstadt (DE)

(72) Inventor: André Engelbert, Wuppertal (DE)

(73) Assignee: Horiba Europe GmbH, Darmstadt (DE)

( * ) Notice: Subject to any disclaimer, the term of this patent is extended or adjusted under 35 U.S.C. 154(b) by 884 days.

(21) Appl. No.: 17/912,762

(22) PCT Filed: Feb. 23, 2021

(86) PCT No.: PCT/EP2021/054401
§ 371 (c)(1),
(2) Date: Sep. 19, 2022

(87) PCT Pub. No.: WO2021/185537
PCT Pub. Date: Sep. 23, 2021

(65) Prior Publication Data
US 2023/0273301 A1      Aug. 31, 2023

(30) Foreign Application Priority Data

Mar. 20, 2020    (DE) .......................... 102020107802.1

(51) Int. Cl.
*G01S 7/497* (2006.01)
*G01S 17/10* (2020.01)
(Continued)

(52) U.S. Cl.
CPC .............. *G01S 7/497* (2013.01); *G01S 17/10* (2013.01); *G01S 17/46* (2013.01); *G01S 17/931* (2020.01);
(Continued)

(58) Field of Classification Search
CPC .................................. G01S 7/497; G01S 17/86
See application file for complete search history.

(56) References Cited

U.S. PATENT DOCUMENTS

| | | | |
|---|---|---|---|
| 4,342,514 A | 8/1982 | Mathews | |
| 5,281,813 A | 1/1994 | Shih | |

(Continued)

FOREIGN PATENT DOCUMENTS

| | | | |
|---|---|---|---|
| DE | 102016218277 A1 | 3/2018 | |

OTHER PUBLICATIONS

Gao, Yanze , et al., "A Programmable All- Optical Delay Array for Light Detection and Ranging Scene Generation", Eee Access, vol. 7, Jul. 29, 2022, pp. 93489-93500.

*Primary Examiner* — Robert W Hodge
*Assistant Examiner* — Clara G Chilton
(74) *Attorney, Agent, or Firm* — Murphy, Bilak & Homiller, PLLC

(57) ABSTRACT

The invention relates to a test system for testing a LIDAR device (1), comprising a controller (5) for generating LIDAR information relating to a simulated LIDAR object based on a real object to be reproduced for a test process, wherein the LIDAR information includes at least one item of two-dimensional contour information and an item of depth information relating to a virtual distance of the simulated LIDAR object; comprising a LIDAR image generation device (6) for generating the simulated LIDAR object based on the LIDAR information; and comprising a LIDAR projection device (7) for projecting the simulated LIDAR object (9) onto a projection surface (8). The depth information is determined on the basis of a time component between the projection surface (8) and the LIDAR device (1) to be tested, which is defined by the controller (5). In one embodiment, a video image generation device can be provided, in order to generate a visible video image of at least one real object on (Continued)

the projection surface. The IR image which is not visible for people and which is projected by the LIDAR projection device is overlayed in a synchronised manner with a video image that is visible for people. In a variant, the test system is suitable for also testing a stereo camera, in addition to the LIDAR device, e.g. which is integrated in a vehicle to be checked, but can also be provided independently, yet in combination with the LIDAR device.

13 Claims, 4 Drawing Sheets

(51) Int. Cl.
  G01S 17/46        (2006.01)
  G01S 17/931       (2020.01)
  G06T 3/40         (2024.01)
  G06T 7/593        (2017.01)

(52) U.S. Cl.
  CPC ................ *G06T 3/40* (2013.01); *G06T 7/593* (2017.01); *G06T 2207/10048* (2013.01)

(56)                References Cited

U.S. PATENT DOCUMENTS

| | | | |
|---|---|---|---|
| 11,264,000 B2 * | 3/2022 | Shibata | B60K 35/23 |
| 2015/0234039 A1 | 8/2015 | Bates et al. | |
| 2017/0359525 A1 * | 12/2017 | Weil | H04N 23/20 |
| 2021/0003683 A1 * | 1/2021 | Chen | G05D 1/0246 |

* cited by examiner

TEST SYSTEM FOR TESTING A LIDAR DEVICE

TECHNICAL FIELD

The invention relates to a test system for testing a LIDAR device, in particular, a LIDAR device provided on a motor vehicle. In addition, the invention relates to a method for testing such a LIDAR device and to a vehicle test bench for testing a vehicle.

BACKGROUND

As autonomous driving motor vehicles are being developed, they are increasingly being equipped with various types of sensors. These sensors include cameras (e.g., 360° cameras) and radar systems designed to monitor the vehicle environment. For autonomous vehicles, it is also important that not only obstacles can be detected, but objects in the vehicle environment can be identified as well. For this purpose, LIDAR (Light Detection And Ranging) devices are increasingly being installed in vehicles. These are devices that use a method related to radar for optical distance and speed measurement, with laser beams being used instead of radio waves as with radar. In this process, the laser beams are in the infrared range, especially, in the near infrared range (NIR), so as not to bother other road users in traffic with visible light from the laser beams.

The mode of operation of LIDAR devices is well known, so that a more detailed description is not necessary at this point.

LIDAR systems work with pulsed light beams (hereinafter also referred to as light impulse or light pulse). In this way, the devices generate an artificial image of the environment around the vehicle from which the light beams are emitted. Depending on the type of sensor, data is produced as point clouds or as a segmented image.

For autonomous vehicles, the function of LIDAR devices is essential and critical to safety. Without the measurement results of the LIDAR devices that continuously scan the environment, the vehicle cannot be moved autonomously or only with restrictions.

Therefore, LIDAR devices have to be tested extensively. On one hand, this is done with system tests in a laboratory environment. On the other hand, the finished operational vehicles are used in practical tests on real roads or test tracks to check the functionality and reliability of the installed LIDAR devices.

To test LIDAR devices, appropriate situations can be simulated on test tracks using, for example, artificial vehicles or humans (dummies) that are moved on moving platforms relative to the vehicle to be tested or pulled by other vehicles. These tests are also very costly, especially since they can only be carried out at a relatively late stage of development, when the vehicle equipped with the respective LIDAR device is already largely developed.

Testing under real road conditions outside of test tracks is also very time-consuming and cost-intensive.

SUMMARY

The invention is based on the object of specifying a test system for testing a LIDAR device, with which the expense incurred during real road operation or operation on a test track can be reduced.

In accordance with the invention, the object is solved by a test system for testing a LIDAR device and by a corresponding test method for testing such a LIDAR device. The test system can advantageously be used in a vehicle test bench for testing a vehicle. Advantageous embodiments of the invention are stated in the dependent claims.

A test system for testing a LIDAR device is specified, comprising a controller for generating LIDAR information regarding an artificial LIDAR object based on a real object to be simulated for a test operation, wherein the LIDAR information comprises at least one piece of two-dimensional outline information and one piece of depth information regarding a virtual distance of the artificial LIDAR object; and comprising a LIDAR image generation device for generating the artificial LIDAR object based on the LIDAR information; and comprising a LIDAR projection device for projecting the artificial LIDAR object onto a projection surface.

With the aid of the test system it is possible to simulate a real object as an artificial LIDAR object (avatar). For this purpose, LIDAR information is defined and generated to create a test environment. For example, for testing the LIDAR device, it can be specified that a vehicle driving ahead that is moving slower than the LIDAR device or a vehicle carrying the LIDAR device should be detected. For example, a truck driving ahead can be simulated or generated as an artificial LIDAR object in this way.

To generate the artificial LIDAR object, at least the two-dimensional outline surface (in the case of a truck, for example, a rectangle) and depth information or distance information are required. The distance information specifies, in particular, how far away the artificial LIDAR object should be from the LIDAR device in the selected test scenario.

Of course, scenarios can be designed from different artificial LIDAR objects to be used as test scenarios. In addition to vehicles driving ahead (cars, trucks, motorcycles, bicyclists), these also include, for example, static obstacles (guardrails, buildings, trees, structural obstacles), humans (pedestrians at the edge of the roadway, pedestrians crossing the roadway, crosswalks, etc.), and so on. Accordingly, since the LIDAR device is intended to support an autonomous vehicle, almost any real objects that may occur in real road traffic can be simulated as artificial LIDAR objects.

The controller is able to generate the artificial LIDAR object. The data required for this purpose, which usually results from the specified test scenarios, can be suitably processed by the controller in order to provide suitable artificial LIDAR objects.

Based on the artificial LIDAR objects, an artificial response image is simulated with the aid of the LIDAR image generation device and the LIDAR projection device. This artificial response image corresponding to the artificial LIDAR object corresponds to an image that the LIDAR device would detect from the detected real object under real conditions, for example, in real road traffic, and convert it as an image.

According to the operating principle of LIDAR, an infrared laser beam would be emitted by the LIDAR device and the reflected beam would be detected and analyzed. In this process, the light beams are pulsed in the form of light pulses and can cover larger areas to encompass surfaces and depth information of the environment scanned in this way.

The images thereby detected by the receiver on the LIDAR device can be simulated in the test system by the LIDAR image generation device and the LIDAR projection device. In particular, the LIDAR projection device uses light pulses (infrared light pulses) to project the artificial LIDAR object onto the projection surface, from where the reflected light can be detected by the receiver on the LIDAR device. It is not apparent to the receiver on the LIDAR device that this is artificially generated light and not a reflected light pulse.

The depth information as a component of the LIDAR information can be at least one-dimensional and, in particular, be based on the time-of-flight of a light pulse, in particular, an infrared light pulse (for example, NIR light by a laser). For the depth information, as well as for the outline information, the distance and the velocity of the real object simulated as an artificial LIDAR object are converted. Accordingly, the two pieces of information can be variable to simulate the movement of the artificial LIDAR object.

The projection surface can be designed in a variety of ways. It is used for "visualization" of the LIDAR object, for example, on a screen or a focusing screen. "Visualization" in this context means making visible to an infrared receiver inside the LIDAR device, but not making visible to humans.

Depth information can be determined based on an actual (real) distance between the projection surface and the LIDAR device to be tested and based on a virtual distance of the artificial LIDAR object. Accordingly, the depth information must be based on a temporal component that is calculated or determined to simulate the (virtual) distance between the LIDAR device and the LIDAR object.

In particular, taking into account the speed of light, the time-of-flight of the light pulses drawing the LIDAR object is determined as a temporal component. In this process, it is taken into account how long the light would take during real operation of the LIDAR device from the light transmitter (emitter) present in the LIDAR device to the object to be detected and—after reflection at the object—back to the light receiver (sensor) present in the LIDAR device. Based on this time period (time-of-flight) derived from the real conditions, the controller simulates the emission of the respective light pulse in such a manner that it can also be received by the light receiver after this time period has elapsed in the test operation of the LIDAR device and thus for generating the artificial LIDAR object. The LIDAR device is thus fooled into thinking that the artificial LIDAR object is also located at the distance corresponding to the real object, although it is actually projected onto the projection surface at a (much) shorter distance.

Since the distance between the LIDAR device and the projection surface is shorter than the (virtual) distance to be achieved between the LIDAR device and the artificial LIDAR object, the light pulse must be generated with a time delay, which is determined accordingly by the controller.

As an example, a truck has already been given above, the outline information of which can be simulated as a rectangular surface. The depth information, for example, a distance of 60 m from the LIDAR device, must be determined by the time-of-flight of the light pulse. Thus, from the target information "distance of 60 m" specified for the test scenario, it is calculated how long a light pulse would take from being sent by the LIDAR device to being received by the LIDAR device. The LIDAR projection device is controlled in such a manner that the IR light pulse drawing the artificial LIDAR object reaches the LIDAR device to be tested at the time when the light reflected by the real truck to be simulated would also reach the LIDAR device again.

The LIDAR projection device can, in particular, include an IR laser device for projecting the LIDAR object as an infrared image on the projection surface. In this process, the infrared image can be drawn two-dimensionally or also by light pulses. In particular, an NIR laser is used for this purpose. Likewise, IR LED light sources can also be used.

A LIDAR detection device can be provided for intercepting and detecting a light pulse emitted by the LIDAR device to be tested. It should be noted that the operating principle of the LIDAR device is to emit a light beam (IR light pulse) and receive it again by the LIDAR device after reflection at the object to be detected. For this purpose, the LIDAR device usually has a transmitter (emitter) and a receiver (sensor).

To ensure that the light pulse from the LIDAR device does not impair the simulated light beams or light pulses in the test system according to the invention, the light pulses must be intercepted by the LIDAR device. In particular, light pulses from the LIDAR device may not reach the projection surface or even be reflected there. In the test system, the projection surface itself is usually relatively close (a few meters) in front of the LIDAR device to be tested, while obstacles or objects at much greater distances (for example, up to 300 m or even more) are to be simulated as a result.

The light pulses emitted by the LIDAR device must be intercepted or dimmed accordingly.

At the same time, it is helpful for the functioning of the test system to detect that a light pulse has been emitted by the LIDAR device. This detection can immediately subsequently trigger the controller to generate its own light pulse with the aid of the LIDAR image generation device and the LIDAR projection device to create the artificial LIDAR object explained above.

The light pulse from the device under test (the LIDAR device to be tested) thus triggers the light pulse from the test system, which can subsequently be received by the receiver of the LIDAR device.

Detection of a light pulse emitted by the LIDAR device to be tested may trigger generation of a corresponding light pulse by the LIDAR projection device. In this process, the LIDAR detection device and/or the controller can be configured to determine a location at which the detected light pulse would have struck a real object, wherein the controller can be configured to generate, with the aid of the LIDAR projection device, an infrared light pulse which is reflected by the projection surface and is detectable by the LIDAR device to be tested as if it were the light pulse emitted by the LIDAR device to be tested and reflected by the real object.

This enables the LIDAR detection device and, if necessary, also the controller to recognize in which part of the projection surface a light pulse needs to be displayed. If the test scenario indeed provides for an artificial LIDAR object at this point, the controller generates a corresponding light pulse with the aid of the LIDAR projection device, which can be received by the LIDAR device and thereupon permits a corresponding analysis.

It is thus possible to determine at which location the light pulse would have hit the object if it had not been previously intercepted by the LIDAR detection device.

To enable subsequent correction of the triggering of the IR light pulse, the test system can have a mechanism for tracking a customer-specific signal generation. The mechanism is configured in such a manner that the keys required for this can be exchanged in encrypted form. In this way, the test system does not need to have direct information about the signal processing of the LIDAR device. Rather, the controller inside the test system is set in such a manner that the time delay of the IR light pulse is set accordingly.

In one embodiment, a video image generation device can be provided for generating a visible video image of at least one real object on the projection surface; wherein the controller can be configured to coordinate the generation of the video image and the generation of the IR image corresponding to the LIDAR object in such a manner that the video image and the IR image are superimposable by the controller in such a manner that, in the resulting overall image, the displayed real object is superimposed on the LIDAR object.

In this embodiment, a video image that is visible to humans is superimposed on the IR image that is invisible to humans and is projected by the LIDAR projection device. In this case, it is advantageous if the visible video image and the invisible IR image are synchronized with one another.

The visible video image can also be received, in particular, by a camera that is installed, for example, in a vehicle to be tested. The camera can also be coupled to the LIDAR device inside the vehicle, if necessary, in order to detect obstacles, road conditions, etc. in the vicinity of the vehicle.

If, for example, the LIDAR object is to simulate the truck already discussed above, the real object, as a video image, can correspond to a truck filmed from behind, which the LIDAR device (virtually) approaches.

In this process, the LIDAR information generated by the LIDAR projection device can be precisely and synchronously superimposed on the visible video image.

An alignment device can be provided for aligning the visible video image and the IR image, as well as the alignment of the camera and the LIDAR device in the test object (e.g., a vehicle to be tested) with the aid of a visible marker in the video image and a marker in the IR image.

It is in the nature of things that, for efficient testing, precise superimposing of the video image and the IR image is expedient, but this alignment cannot be easily performed by an operator, since they can only see the video image, but not the IR image with their eyes. For this purpose, it is possible to enrich the IR image, which is invisible to humans, with a marker that is visible to humans. Thus, the alignment device can superimpose the corresponding marker on the IR image, so that the projected IR image also has visible components that can be used as a marker and aligned with the video image.

The alignment process can also be automated in this way.

The alignment device can include a marker image device for superimposing the marker on the IR image before the IR image is projected onto the projection surface. In this way, as explained above, the IR light beam can be superimposed on a visible light beam.

In one variant, the test system is suitable for testing, in addition to the LIDAR device, a stereo camera that is installed, for example, in a vehicle to be tested, but can also be provided autonomously, yet in combination with the LIDAR device.

Accordingly, a stereo image device comprising two video image generation devices coupled to one another can be provided for generating a visible video image of at least one real object on the projection surface, wherein the video images each represent a view of the real object in such a manner that they represent a stereo image by merging them, the controller is configured to coordinate the generation of the video images and the generation of the IR image corresponding to the LIDAR object in such a manner that the video images and the IR image are superimposable by the controller in such a manner that, in the resulting overall image, the displayed real object is superimposed on the LIDAR object.

In this way, it is possible to generate a stereo image by the test system, which can be alternately fed to the cameras by corresponding control of the shutter mechanisms arranged in front of the respective receivers or cameras of the stereo camera. Due to the different positions of the cameras, which can be arranged side by side, for example, a three-dimensional image can be reconstructed in a known manner.

The structure of such a stereo camera is known per se, so that further description is not necessary at this point.

In the variant of the test system according to the invention described here, two different video images of a real object can be generated, which are, however, coordinated with one another with regard to the viewing angle and perspective, in order to also achieve the stereo effect. The test system designed in this way thus simulates stereo images that can be alternately received or recorded by the cameras of the stereo camera to be tested by controlling the shutters.

The video image can be generated three-dimensionally in addition to the testing of a stereo LIDAR device described above, e.g., with the aid of the two video image generation devices (beamers). In this way, for example, a stereo camera can also be tested on a vehicle. Likewise, the interaction of the LIDAR device to be tested with the stereo camera installed in the vehicle can be tested. While the stereo camera analyzes the visible video image and detects objects on this basis, for example, the LIDAR device to be tested can determine additional information (e.g., spacing, distance, motion, speed).

With the aid of the test system described above, it is possible to test a standard, commercially available LIDAR device or a LIDAR device that is already installed in a vehicle and is part of the vehicle's standard or optional equipment, without having to make any changes to the LIDAR device. In particular, the LIDAR device does not require any structural or software modifications or changes to the controller of the LIDAR device. Rather, the LIDAR device can be used as it would be used in real road traffic. For the LIDAR device, the artificial LIDAR object provided by the test system is indistinguishable from a real object.

The described test system can be used particularly advantageously in a vehicle test bench for testing a vehicle. Accordingly, also a vehicle test bench for testing a vehicle is specified, comprising a test system according to the above explanations, for testing a LIDAR device provided on the vehicle; and comprising a test system for testing the vehicle.

Vehicle test stands are known in a variety of ways. They are used, for example, for testing power trains (e.g., as a dynamometer), vibration behavior of a motor vehicle, exhaust gas testing, etc. In the process, the vehicles have to complete a wide variety of test cycles, many of which are also prescribed by law.

In accordance with the invention, a vehicle test bench known per se comprising a conventional test system can be extended by the above-described test system in order to test in this way also a LIDAR device present on the vehicle. In this way, tests for the LIDAR device on the vehicle can also be carried out at the same time during the test cycles that have to be performed as part of development work, but often also due to legal regulations. The result is a considerable increase in efficiency, because several test operations can be carried out simultaneously.

Accordingly, this is a combination of a LIDAR test bench described above and a "classic" vehicle test bench. A complete vehicle can be tested in this way in a single pass, including a combination of LIDAR detection and vehicle behavior. If necessary, image recognition by cameras present on the vehicle can also be tested on the basis of the video projection described. The vehicle test bench is thus able to test a wide variety of functions of a device under test configured as an autonomously driving vehicle.

A method for testing a LIDAR device, comprising the steps of:

detecting a light pulse emitted by the LIDAR device to be tested;

intercepting the light pulse before it reaches a projection surface arranged in the direction of the light pulse;

generating an artificial response light pulse generated based on an artificial LIDAR object to simulate detection of the artificial LIDAR object by the LIDAR device to be tested;

projecting the response light pulse onto the projection surface and reflecting the response light pulse from the projection surface;

receiving the response light pulse reflected from the projection surface by the LIDAR device to be tested.

If necessary, the direction of the light pulse emitted by the LIDAR device can also be determined to increase accuracy.

In this process, the artificial LIDAR object serves as a virtual test object that is generated artificially.

These and additional features and advantages are explained in more detail below by way of examples with the aid of the accompanying figures, in which:

DETAILED DESCRIPTION

Figure 1:
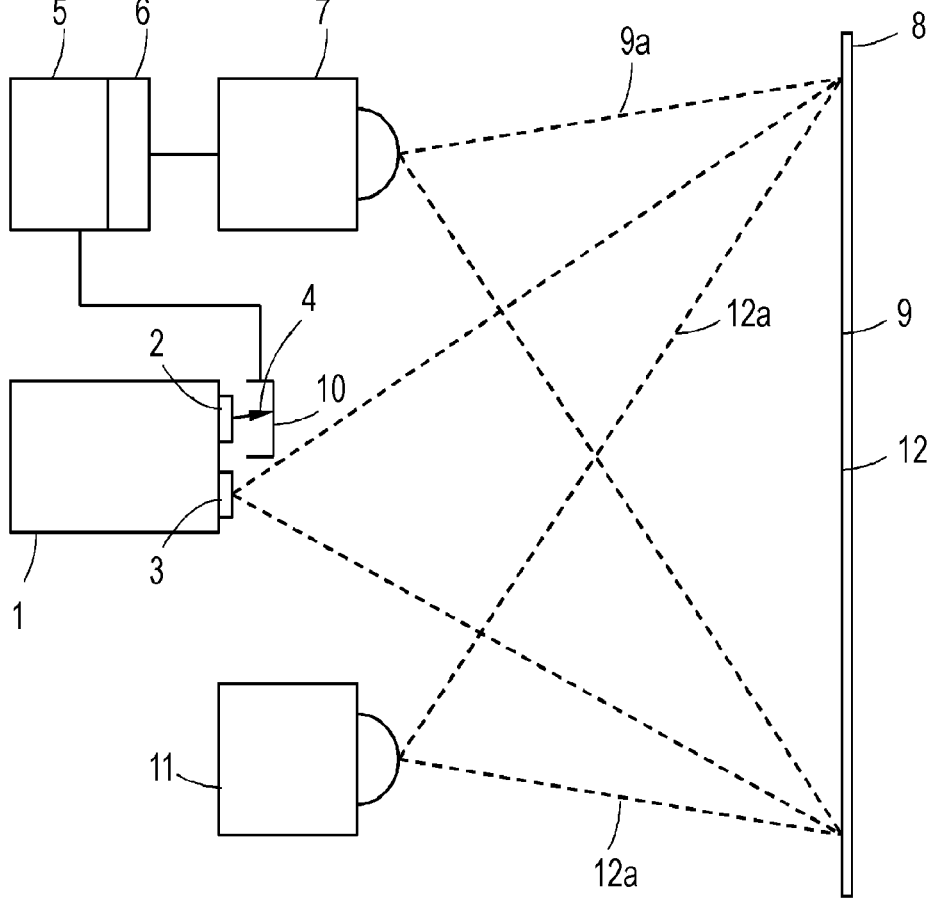
FIG. 1 shows a schematic diagram of a test system for testing a LIDAR device.

FIG. 1 shows a test system for testing a LIDAR device 1.

The LIDAR device 1 is constructed in a known manner and can, for example, be installed in a vehicle. It has an infrared scanning mechanism (for example, a NIR laser scanner or a solid-state LIDAR) comprising an emitter 2 and a receiver 3. In the test system, the LIDAR device serving as the device under test can accordingly be tested with the vehicle, but also separately in a stand-alone position.

The mode of operation of the LIDAR device 1 has already been explained above. In particular, the emitter 2 emits an infrared light pulse 4 that can be reflected by a real object in real road traffic and subsequently received and detected by the receiver 3. Of course, the emitter 2 can also generate a plurality of light pulses 4 covering an area to be detected by the LIDAR device 1.

Based on the time-of-flight of the light pulse 4 or the plurality of light pulses 4, a three-dimensional relief of the environment of the LIDAR device 1 can be detected with the aid of the receiver 3. In particular, the time-of-flight of the light pulses allows the determination of a piece of distance or depth information in order to be able to determine the depth information as a third coordinate in addition to the area information, which can also be detected by a radar, for example.

The test system has a controller 5 comprising an image generation device 6. The controller 5 serves to generate LIDAR information regarding a virtual or an artificial LIDAR object (avatar) based on a real object to be simulated for a test scenario. For example, it may be part of a test scenario to simulate a truck driving ahead. Based on the given test scenario, the controller 5 is able to generate the required data with which the truck driving ahead is simulated.

This data (LIDAR information) includes, in particular, a piece of two-dimensional outline information and a piece of depth information regarding a virtual distance of the artificial LIDAR object. For example, the truck can be simulated by a two-dimensional rectangular area as outline information. In addition, the controller 5 can generate the associated depth information by which the distance of the virtual truck from the LIDAR device 1 to be tested is to be simulated. The depth information can change in this process in order to be able to simulate a movement or speed of the truck as well.

With the aid of the image generation device 6, it is possible to generate the artificial LIDAR object based on the LIDAR information generated by the controller 5 and define it as an infrared image. The image generation device 6 can be an integral part of the controller 5.

The controller 5 or the image generation device 6 control a LIDAR projection device 7, with which the generated artificial LIDAR object can be projected onto a projection surface 8.

The projection device 7 can, in particular, be an infrared laser or an infrared LED that generates infrared light 9a (e.g., as an IR light pulse or as a plurality of IR light pulses) and projects the artificial LIDAR object onto the projection surface 8 in the form of an (invisible) infrared image 9 (IR image).

The LIDAR device 1 to be tested is positioned in front of the projection surface 8 and is able to receive the infrared image 9 from the projection surface 8 via its receiver 3.

In this process, it is necessary that all infrared light pulses 4 emitted by the emitter 2 of the LIDAR device 1 are intercepted. For this purpose, a detection device 10 is arranged in front of the emitter 2, which intercepts all light pulses 4 and, in particular, prevents the light pulses 4 from reaching the projection surface 8 and subsequently being detected by the receiver 3.

Moreover, in one variant, the detection device 10 can be configured differently to detect the respective light pulse and, if applicable, its direction. In this way, the generation of a light pulse by the projection device 7 can be triggered by coupling the detection device 10 with the controller 5. The light pulse 4 emitted by the emitter 2 thus serves as a trigger for the generation of a light pulse by the projection device 7.

By appropriate coordination, the light pulse generated by the projection device 7 is emitted in the direction in which the respective current light pulse 4 from the emitter 2 would also occur on an imaginary (virtual) object.

Since, for example, a light pulse which in a real situation would strike and be reflected back by the emitter 2 to a truck 60$m$ away would have to travel 120$m$, a corresponding time would elapse before the reflected light pulse could be received again by the receiver 3. This delay is taken into account by the controller 5, which generates the light pulse by the projection device 7 only with a corresponding delay.

In this way, a two-dimensional infrared image 9 can be generated.

In the test system, the light or laser pulses normally transmitted by the LIDAR device installed in the vehicle are thus replaced by an artificial LIDAR signal. In this process, the controller 5 generates a virtual test object on the projection surface 8, which is generated in real time with regard to the parameters distance, size and, if necessary, also movement (speed) and can be received by the receiver (LIDAR sensor).

For processing the information that a light pulse 4 has been detected by the detection device 10 and thereby a corresponding infrared light pulse 9a is to be generated by the projection device 7, a certain processing time is required. This processing time should naturally be kept very short in order to minimize possible measurement errors. For example, it is in a range below 20 ns (e.g., at about 10 ns, depending on the design of the components). This delay can lead to a deviation of the distance measurement. For example, the corresponding error may be 3 m for a processing time of 10 ns. Accordingly, the distance of the virtual test object measured by the LIDAR device can still be corrected subsequently, taking into account the processing time.

To enable subsequent correction, the test system can have a mechanism for tracking a customer-specific signal generation. The mechanism is configured in such a manner that the keys required for this can be exchanged in encrypted form. In this way, the test system does not need to have direct information about the signal processing of the LIDAR device.

In addition to the infrared or LIDAR projection device 7, a video beamer 11 serving as a video image generation device is provided, which projects a visible video image 12 onto the projection surface 8 with the aid of visible light 12a onto the same surface onto which the infrared image 9 is projected. The video image 12 can also be artificially generated, but may show real driving situations in the various test scenarios.

For example, the truck already discussed several times can also be made visible to the camera installed in a vehicle as well as to an operator in the form of the video image 12, while the infrared image 9 is invisible to humans due to the principle.

The video beamer 11 can also be directly controlled by the controller 5 to coordinate the generation of the visible video image 12 and the generation of the infrared image 9.

Likewise, it is possible for the projection device 7 and the video beamer 11 to be integrated into a common device so that this device equally generates the infrared image 9 and the visible video image 12.

The controller 5 can be configured to implement and simulate even more complex test scenarios. Accordingly, the controller 5 can generate data in real time which, in addition to pure image data, also contains object data (e.g., corresponding to different object classes, such as "vehicles", "humans", "traffic signs", "trees", etc.). This object list can be generated automatically according to the selected test scenarios. Likewise, it can also be influenced externally for test purposes by an operator of the test system.

Figure 2:
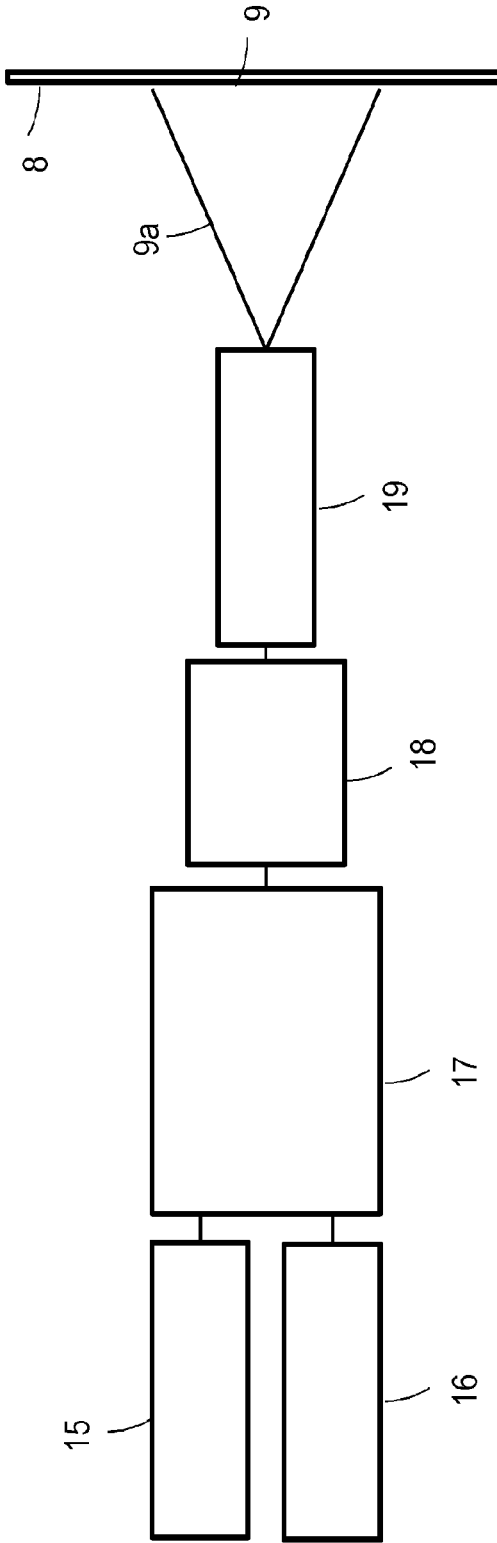
FIG. 2 shows a schematic setup of a LIDAR projection device.

FIG. 2 shows the LIDAR projection device 7 in greater detail.

It features an NIR (near infrared) light source 15 and a light source 16 for visible light. The two light sources 15, 16 can each be controlled by the controller 5. The light beams of the two light sources 15, 16 are optically combined or superimposed on one another in an optical combination mechanism 17. For this purpose, for example, semi-transparent mirrors or the like can be used in a suitable manner. The result is a combined light beam of visible light from the light source 16 and infrared light from the NIR light source 15.

In particular, the visible light from the light source 16 can, in this process, be used to create a visible marker on the projection surface 8. Using this marker, an operator can, for example, match the infrared image 9 and the video image 12 on the projection surface 8 (cf. FIG. 1).

For example, the light source 16 can generate visible light in the form of a suitable marking image with dots or crosses generated as needed on the projection surface 8.

An image mechanism 18 is arranged adjacent to the light beam combination mechanism 17. The image mechanism 18, which can also be controlled by the controller 5 or the image generation device 6, can, for example, be formed by a DMD (Digital Mirror Device) mechanism, an LCD (Liquid Crystal Display) mechanism or a DBD (Direct Beam Distribution) mechanism. With the aid of the image mechanism 18, an infrared light pattern is generated, which is subsequently projected onto the projection surface 8 with the aid of projection optics 19, where it generates the infrared image 9.

The infrared light is, in particular, pulsed light, where the depth information (third coordinate) is achieved by the delay of the light pulses from the NIR light source 15, while the image mechanism 18 essentially defines the two-dimensional outline information (position, size, etc.).

Figure 3:
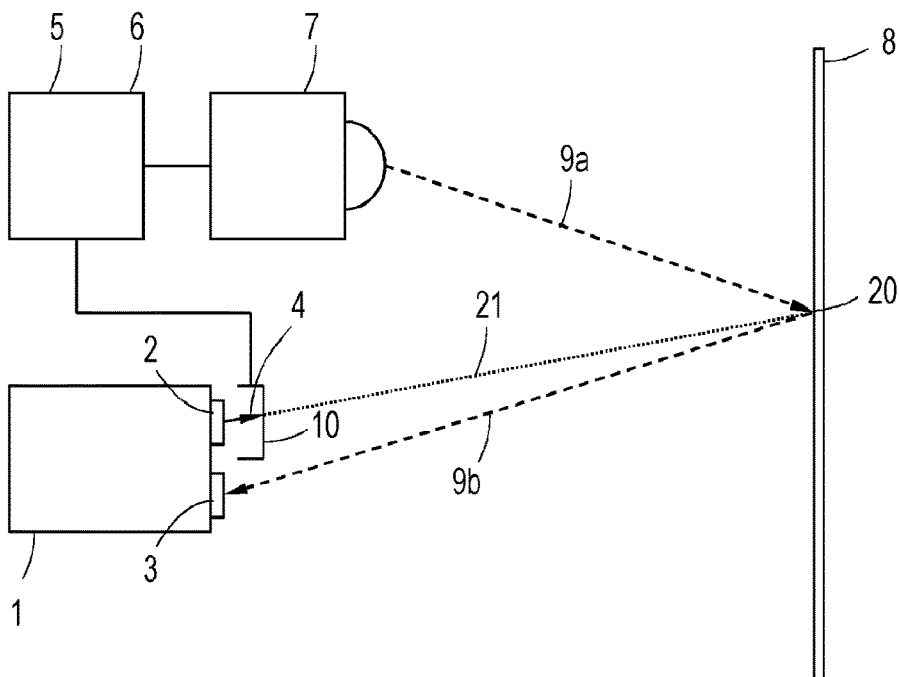
FIG. 3 shows a schematic diagram to explain the mode of operation of the test system.

FIG. 3 shows, by way of example, the interaction between the LIDAR device 1 to be tested and the test system in detail.

Accordingly, the emitter 2 of the LIDAR device 1 emits the infrared light pulse 4 which is shielded by the detection device 10.

The detection device 10 detects that a light pulse 4 has been emitted, and in this way triggers the generation of a corresponding infrared light pulse 9a by the projection device 7 with the aid of the controller 5 or the image generation device 6.

The infrared light pulse 9a is projected onto a location 20 on the projection surface 8 which corresponds to the location 20 which the light pulse 4 would have struck if it had not been shielded by the detection device 10. The corresponding direction of the infrared light pulse 4 is symbolized by a virtual line 21.

Accordingly, the generated infrared light pulse 9a strikes the location 20 and is reflected therefrom as an infrared light beam 9b so that it can be detected by the receiver 3 of the LIDAR device 1.

Accordingly, the time sequence is as follows: emitting an infrared light pulse 4 by the emitter 2-detecting the light pulse 4 by the detection device 10-triggering a corresponding infrared light pulse 9a by activating the projection device 7 via the controller 5-projecting the infrared light pulse 9a onto the projection surface 8-receiving the infrared light beam 9b reflected from the projection surface 8 by the receiver 3-determining the time period between emission by the emitter 2 and reception by the receiver 3-if necessary, determining the (virtual) distance of the artificial LIDAR object generated at the location 20 (virtual test object).

Figure 4:
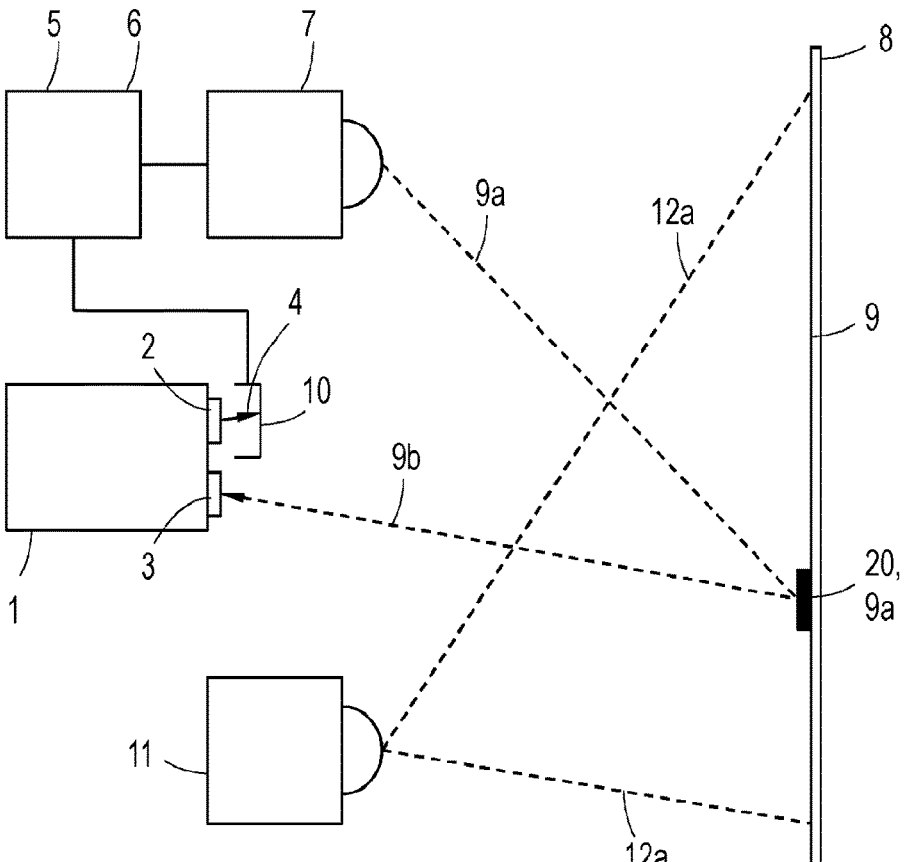
FIG. 4 shows another diagram to explain the mode of operation of a test system.

FIG. 4 shows a situation similar to FIG. 3, with the addition of the video beamer 11, which projects the visible light 12a onto the projection surface 8, thereby generating the video image 12.

For example, the already discussed rear view of a truck driving ahead can be depicted with the visible light 12a at the location 20. At the same time, an infrared light pulse 9a can, with the aid of the projection device 7, be projected onto the location 20 (in this case, the rear of the depicted truck), which is detected by the receiver 3.

In accordance with its intended function, the LIDAR device 1 is able to measure the time period between the emission of a light pulse by the emitter 2 and the reception of the infrared light pulse 9a by the receiver 3 and to determine therefrom the (virtual) distance of the (virtual) object generated at the location 20.

Figure 5:
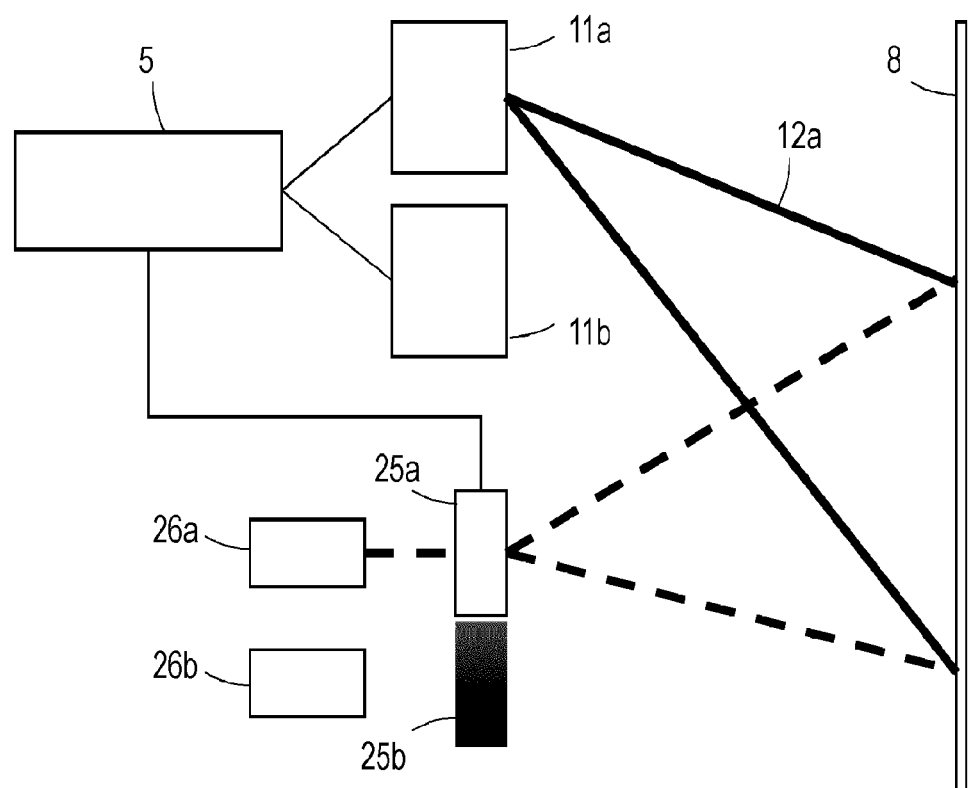
FIG. 5 shows a schematic setup of a test system for a stereo camera.
Figure 6:
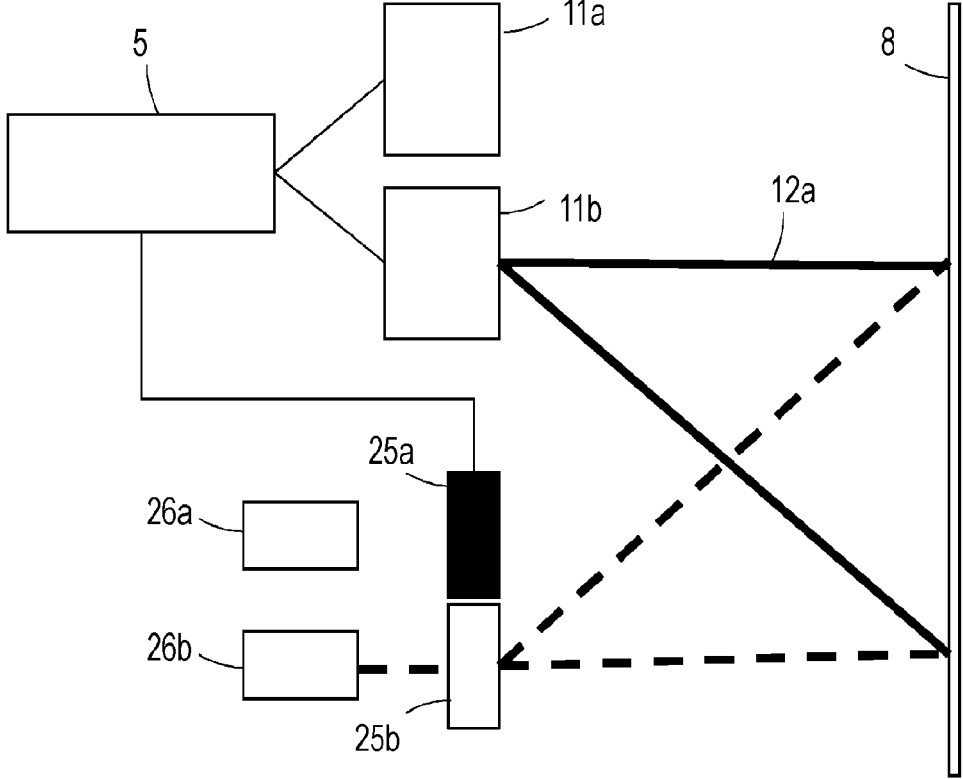
FIG. 6 shows the test system of FIG. 5 in another operating state.

FIGS. 5 and 6 show the setup of the test system as a stereo test system for testing a stereo camera device.

The devices of the LIDAR device already explained in detail above are no longer shown in the figures, so that only the differences or additions are explained.

Accordingly, the stereo camera device to be tested has two receivers or cameras 26*a*, 26*b* (e.g., a stereo camera in a test vehicle). A shutter 25*a*, 25*b* is arranged in front of each of the cameras 26*a*, 26*b*.

The video beamer 11 is realized in the form of two separate projection devices 11*a* and 11*b*, which alternately generate corresponding image information as visible light 12*a*. In this process, the image information from the projection device 11*a* is intended to be received by the camera 26*a*. Accordingly, in this case (FIG. 5), the shutter 25*a* is open while the shutter 25*b* is closed.

In the other case, the projection device 11*b* is activated, the image information of which is intended to be received as visible light 12*a* by the camera 26*b*. Accordingly, in this state (FIG. 6), the shutter 25*a* in front of the camera 26*a* is closed while the shutter 25*b* in front of the camera 26*b* is open so that the light beam reflected by the projection surface 8 can reach the camera 26*b*.

To synchronize the interaction between the projection devices 11*a*, 11*b*, the cameras 26*a*, 26*b* (the stereo camera to be tested) and the respective associated shutters 25*a*, 25*b*, the controller 5 has a synchronization mechanism that ensures the changeover at high frequency. Depending on the configuration, the changeovers may be performed at a suitable frequency of 10 Hz or more.

As a result, a stereo image can be detected by the stereo camera to be tested, which can then determine and provide further information in addition to the times-of-flight of the IR light pulses. This configuration enables the test system to also test a sensor fusion installed in the test object (vehicle).

For the purpose of explanation, the above description usually refers to a light pulse. In fact, however, the function of a LIDAR device is based on the emission of a large number of light pulses, which ultimately generate a two-dimensional infrared image, for example, as a point cloud. Accordingly, the test system is also able to send many light pulses at high speed with the aid of the projection device 7, in order to generate a corresponding infrared image on the projection surface 8, which can be detected by the receiver 3.

The invention claimed is:

1. A test system for testing a LIDAR (Light Detection And Ranging) device, comprising:

a controller configured to generate LIDAR information regarding an artificial LIDAR object based on a real object to be simulated for a test operation, wherein the LIDAR information comprises at least one piece of two-dimensional outline information and one piece of depth information regarding a virtual distance of the artificial LIDAR object;

a LIDAR image generation device configured to generate the artificial LIDAR object based on the LIDAR information;

a LIDAR projection device configured to project the artificial LIDAR object onto a projection surface; and a video image generation device configured to generate a visible video image of at least one real object on the projection surface, wherein the controller is configured to coordinate the generation of the visible video image and the generation of an IR image corresponding to the LIDAR object such that the visible video image and the IR image are superimposed by the controller in such a manner that, in a resulting overall image, the displayed real object is superimposed on the LIDAR object.

2. The test system of claim 1, wherein the depth information is determined based on an actual distance between the projection surface and the LIDAR device to be tested, and based on a virtual distance of the artificial LIDAR object.

3. The test system of claim 1, wherein the LIDAR projection device comprises an IR laser device configured to project the LIDAR object as an infrared image onto the projection surface.

4. The test system of claim 1, further comprising:

a LIDAR detection device configured to intercept and detect a light beam emitted by the LIDAR device to be tested, wherein the light beam is intercepted before reaching the projection surface.

5. The test system of claim 4, wherein the LIDAR detection device and/or the controller is configured to determine a location at which the detected light beam would have struck a real object, and wherein the controller is configured to generate, with the aid of the LIDAR projection device, an infrared light pulse which is reflected by the projection surface and detected by the LIDAR device to be tested as if the reflected infrared light pulse were the light beam emitted by the LIDAR device to be tested and reflected by the real object.

6. The test system of claim 1, wherein the detection of a light beam emitted by the LIDAR device to be tested triggers generation of a corresponding light beam by the LIDAR projection device.

7. The test system of claim 6, wherein the controller is configured to determine a location at which the detected light beam would have struck a real object, and wherein the controller is configured to generate an infrared light pulse which is reflected by the projection surface and detected by the LIDAR device to be tested as if the reflected infrared light pulse were the light beam emitted by the LIDAR device to be tested and reflected by the real object.

8. The test system of claim 1, further comprising:

an alignment device configured to align the visible video image and the IR image with the aid of a visible marker in the IR image.

9. The test system of claim 8, wherein the alignment device comprises a marker image device configured to superimpose the visible marker on the IR image before the IR image is projected onto the projection surface.

10. The test system of claim 1, further comprising:

a stereo image device comprising two video image generation devices coupled to one another and each configured to generate a visible video image of at least one real object on the projection surface, wherein the visible video images generated by the two video image generation devices each represent a view of the real object such that the visible video images represent a stereo image when merged, wherein the controller is configured to coordinate the generation of the video images generated by the two video image generation devices and the generation of the IR image corresponding to the LIDAR object such that the video images generated by the two video image generation devices and the IR image are superimposed by the controller in such a manner that, in a resulting overall image, the displayed real object is superimposed on the LIDAR object.

11. The test system of claim 10, wherein the test system is configured to test a stereo camera device with two cameras, wherein two shutter mechanisms assigned to the respective cameras on the stereo camera device to be tested are configured to block or unblock, as required, an incidence of light on the respective cameras, and wherein the controller comprises a synchronization mechanism configured to synchronize the two video image generation devices provided in the stereo image device with the shutter mechanisms such that a view of the real object can be alternately detected by one of the two cameras.

12. A vehicle test bench for testing a vehicle, comprising:

the test system of claim 1 present on the vehicle; and an additional test system configured to test the vehicle, wherein the additional test system is selected from the group consisting of a vehicle power train test system, a performance test system, a vibration test system, and an exhaust test system.

13. A method for testing a LIDAR device, the comprising:

detecting a light pulse emitted by the LIDAR device to be tested;

intercepting the light pulse before the light pulse reaches a projection surface arranged in a direction of the light pulse;

generating an artificial response light pulse based on an artificial LIDAR object to simulate detection of the artificial LIDAR object by the LIDAR device to be tested, wherein the artificial LIDAR object is based on LIDAR information that has been generated based on a real object to be simulated for a test operation, wherein the LIDAR information comprises at least one piece of two-dimensional outline information and one piece of depth information regarding a virtual distance of the artificial LIDAR object;

projecting the artificial response light pulse onto the projection surface and reflecting the artificial response light pulse from the projection surface;

receiving the artificial response light pulse reflected from the projection surface by the LIDAR device to be tested;

generating a visible video image of at least one real object on the projection surface; and coordinating the generation of the video image and the generation of an IR image corresponding to the LIDAR object such that the video image and the IR image are superimposed in such a manner that, in a resulting overall image, the displayed real object is superimposed on the LIDAR object.

* * * * *